(12) United States Patent
Tribble et al.

(10) Patent No.: US 8,219,623 B2
(45) Date of Patent: Jul. 10, 2012

(54) EMAIL TRANSPORT RULE PER-RECIPIENT CONDITION

(75) Inventors: Eric Dean Tribble, Bellevue, WA (US); Gautam Pulla, Redmond, WA (US); Min Wei, Bellevue, WA (US); Sung-Hsun Su, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 615 days.

(21) Appl. No.: 11/305,415

(22) Filed: Dec. 16, 2005

(65) Prior Publication Data

US 2007/0143418 A1 Jun. 21, 2007

(51) Int. Cl.
*G06F 15/16* (2006.01)
(52) U.S. Cl. ........................................ 709/206; 709/207
(58) Field of Classification Search .................. 709/206, 709/201, 202, 203
See application file for complete search history.

(56) References Cited

U.S. PATENT DOCUMENTS

| | | | |
|---|---|---|---|
| 5,958,005 A | 9/1999 | Thorne et al. | |
| 6,529,942 B1 * | 3/2003 | Gilbert | 709/206 |
| 6,721,785 B1 | 4/2004 | Raghunandan | |
| 7,027,463 B2 * | 4/2006 | Mathew et al. | 370/463 |
| 7,216,146 B2 * | 5/2007 | Pous et al. | 709/206 |
| 2002/0013817 A1 * | 1/2002 | Collins et al. | 709/206 |
| 2002/0073313 A1 * | 6/2002 | Brown et al. | 713/165 |
| 2003/0191969 A1 * | 10/2003 | Katsikas | 713/201 |
| 2004/0098460 A1 * | 5/2004 | Hehl et al. | 709/206 |
| 2004/0177271 A1 * | 9/2004 | Arnold et al. | 713/201 |
| 2005/0038862 A1 | 2/2005 | Keohane et al. | |
| 2005/0080864 A1 * | 4/2005 | Daniell | 709/206 |
| 2005/0160148 A1 * | 7/2005 | Yu | 709/206 |
| 2006/0010215 A1 * | 1/2006 | Clegg et al. | 709/206 |
| 2006/0101126 A1 | 5/2006 | Huang | |
| 2006/0277260 A1 | 12/2006 | Hardy, Jr. | |
| 2007/0106736 A1 * | 5/2007 | Shepherd | 709/206 |
| 2007/0106741 A1 | 5/2007 | Christoff et al. | |
| 2007/0226300 A1 | 9/2007 | Smith et al. | |

FOREIGN PATENT DOCUMENTS

| | | |
|---|---|---|
| WO | 00/07355 A | 2/2000 |
| WO | 2005/008941 A | 1/2005 |

\* cited by examiner

*Primary Examiner* — Thu Nguyen
*Assistant Examiner* — Nam Tran
(74) *Attorney, Agent, or Firm* — Senniger Powers LLP

(57) ABSTRACT

A schema for a rule transport engine to be applied to an email having multiple recipients. The schema defines a rule which executes one or more specific actions for a particular recipient or a particular group of recipients receiving a message instance of a bifurcated message when the message meets certain conditions.

11 Claims, 4 Drawing Sheets

EXAMPLE: RULE 1 -- ADDING DISCLAIMER TEXT TO RECIPIENTS IN GROUP 1, WHICH CONTAINS USER R1 AND R2

1

MESSAGE FOR RECIPIENTS R1, R2, R3, R4

APPLYING RULE 1

MESSAGE WITH DISCLAIMER FOR RECIPIENTS R1, R2

MESSAGE WITHOUT DISCLAIMER FOR RECIPIENTS R3, R4

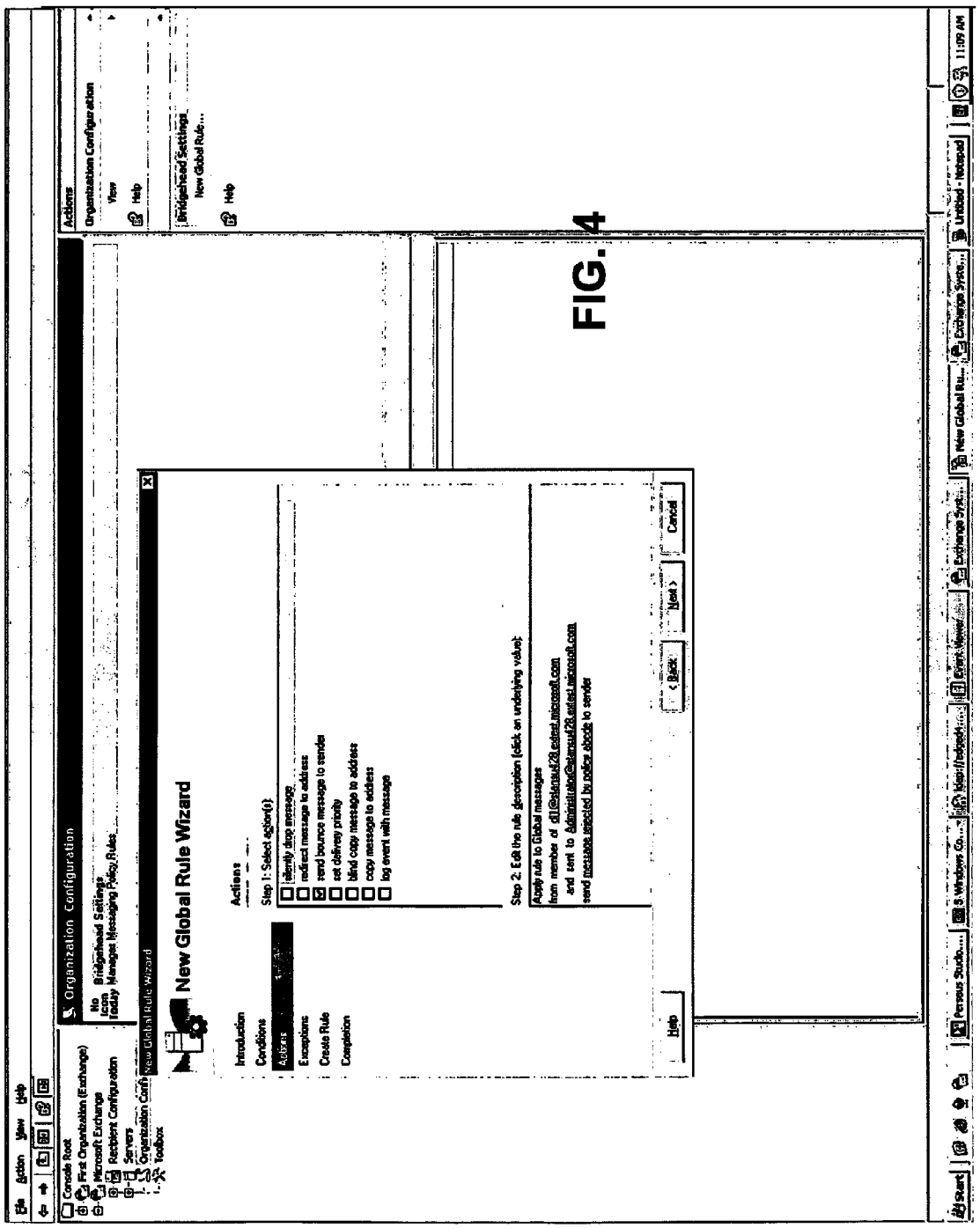

EMAIL TRANSPORT RULE PER-RECIPIENT CONDITION

BACKGROUND

This generally relates to email transport rules and, in particular, email transport rule schemas which apply to instances of bifurcated emails having multiple recipients based on the recipients.

For email transport systems, bifurcation based on recipient is common. Frequently, one or more specific actions should be applied for a particular recipient or a particular group of recipients. For example, recipient specific actions may include stripping attachments of a message which includes particular recipients and signing/encrypting messages of certain recipients.

An example of such a system would execute the following rules:

```
{
    For rule 1,
        check condition,
        execute actions if the condition is evaluated to true
    For rule 2,
        check condition,
        execute actions if the condition is evaluated to true
    For rule 3,
    ...
}
```

The above rules result in actions that will apply to the entire message and affect all recipients. Thus, without recipient conditions, email administrators are unable to specify rules applying only to specific recipients. Such situations could restrict or make difficult what an administrator could do on a recipient by recipient basis. For example, in certain systems administrators could not specify a rule which would strip attachments only of a group of recipients (e.g., acmeGroup), such as:

```
IF
    a message recipient IsMemberOf "acmeGroup"
Then
    Strip attachments "*.jpg"
```

The above rule does not allow an administrator to strip only attachments of an email to the group if the email includes addressees in addition to the group. This is because this rule would strip attachments on the entire message, instead of stripping attachments only for the message instance sent to the recipients belonged to the "acmeGroup".

SUMMARY

In one embodiment, the invention comprises systems, methods and schemas for a rule transport engine to be applied to an email having multiple recipients. The system, method and schema implement a rule which bifurcates messages and executes one or more specific actions for a particular recipient or a particular group of recipients receiving a bifurcated message instance, when the message meets certain conditions.

Other features will be in part apparent and in part pointed out hereinafter.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

FIG. 4 is a screen shot of one embodiment of an exemplary implementation of a system according to the invention illustrating action selection.

Figure 1:
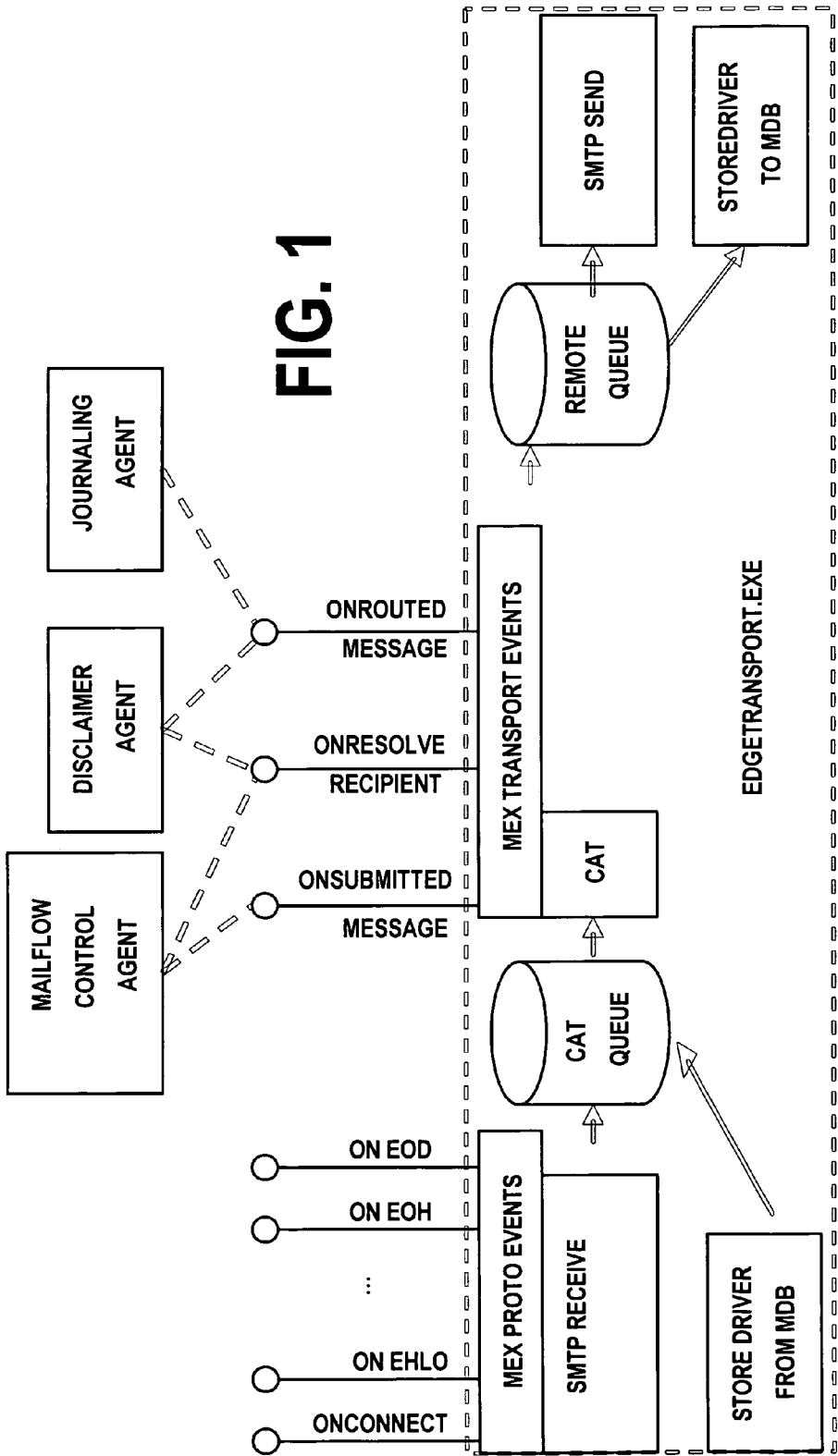
FIG. 1 is a block diagram of one embodiment of an exemplary operating environment of a system according to the invention.

events.

Corresponding reference characters indicate corresponding parts throughout the drawings.

DETAILED DESCRIPTION

According to one embodiment of the invention, a transport subsystem such as illustrated in FIG. 1 is extended with capability that allows email administrators to specify rules to extend and customize the email flows within an enterprise in order to meet regulatory compliances and specific company policies. A transport processor (such as a categorizer denoted as CAT in FIG. 1) uses a network eventing mechanism (such as a message exchange denoted as MEX in FIG. 1) to allow extensions (called agents) to host rules composed by administrators. Initially, when a message is received by the SMTP, message exchange protocol events such as CONNECT, EHLO ("hello"), EOH (end of header) and EOD (end of data) are determined. The message proceeds to the categorizer via a queue where the message exchange MEX evaluates it. Some of the events (such as an ONSUBMITTED MESSAGE event) allow rules to be applied at the entire message level, while other events (such as ONROUTED MESSAGE and ONRESOLVE RECIPIENT events) allow rules to be applied at the per recipient (group) level. The recipient conditions will be allowed and executed at the ONROUTED MESSAGE and/or ONRESOLVE RECIPIENT When a rule such as the following is about to be executed on a current message:

```
<rule name = "rule1">
    <applyTo DL= "acmegroup1" />
    <condition />
    <action />
</rule>
``` the rule engine hosted by the agents (in FIG. 1) will bifurcate the current message. Each bifurcated message instance which has the recipients that meet the membership criteria (e.g., the distribution list (DL) includes acmegroup1) will be further tested against the condition clause. If the condition evaluates to true, the action specified the actions clause will be executed. For example, the actions may be stripping attachment, adding attachment, adding text (e.g., disclaimer), re-routing, adding or deleting recipient, rejecting message, silently deleting message, dropping connection, changing subject or other headers, putting message in quarantine, set spam confidence level, archiving message, logging an event, changing delivery priority, applying security templates (such as adding RMS DoNotForward restriction, etc.

This recipient condition clause is both intuitive to the administrators and efficient for the transport system. An alternative design and implementation would be to bifurcate messages for every recipient. However, this alternative may cause an excessive number of messages to be created and thus could have a negative impact on the overall system performance.

Figure 2:
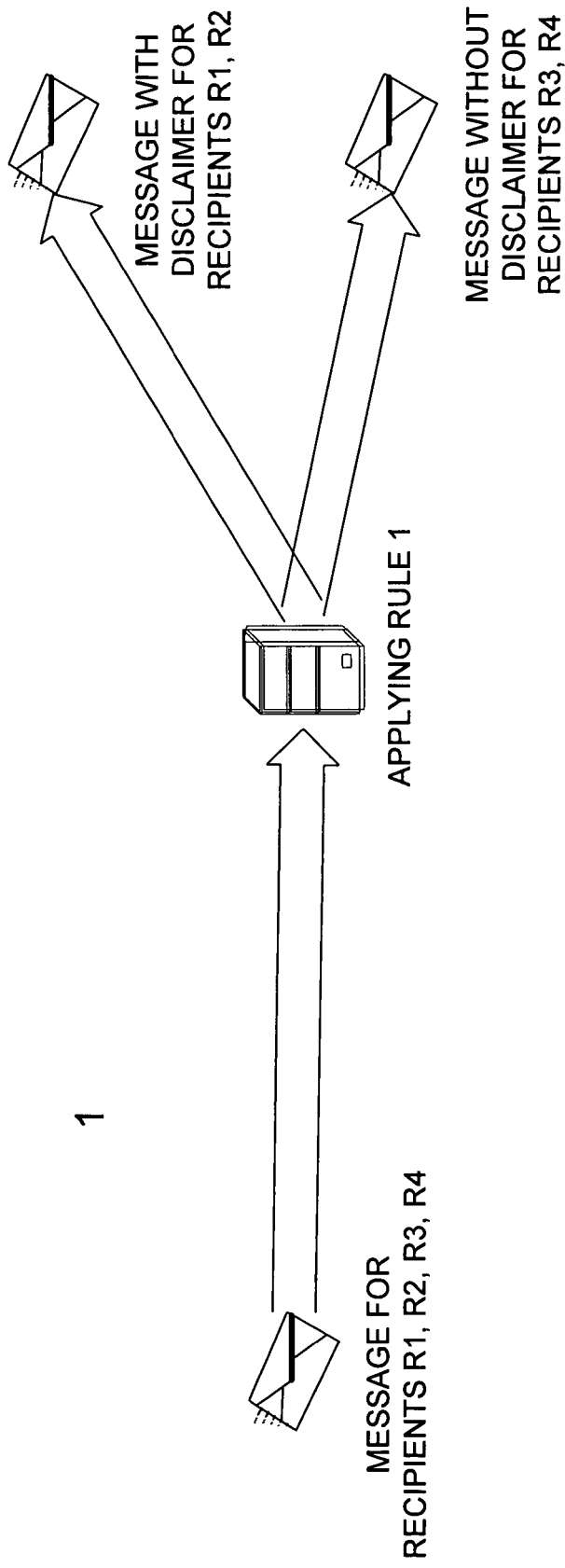
FIG. 2 illustrates a diagram of a multiple email message which is bifurcated because one of the bifurcated message instances requires an action based on the recipient.

Referring to FIG. 2, a diagram illustrates a multiple email message which is bifurcated and one of the bifurcated message instances requires an action based on its recipient. In one embodiment, the invention includes systems, methods and/or schemas which bifurcate a message while processing rules (per-rule message bifurcation). For example, a rule engine would execute rules such as rules 1 and/or 2:

```
{
    For rule 1,
        bifurcate if necessary,
        check condition,
        execute actions if the condition is evaluated to true
    For rule 2,
        bifurcate if necessary,
        check condition,
        execute actions if the condition is evaluated to true
    For rule 3,
    ...
}
```

Thus, in one embodiment, the invention comprises systems, methods and schemas for a rule transport engine to be applied to an email having multiple recipients. The system, method and schema implement a rule which bifurcates messages and executes one or more specific actions for a particular recipient or a particular group of recipients receiving a bifurcated message instance, when the message meets certain conditions.

In particular, in one embodiment, a rules engine applies a rule to an email to be transported having multiple recipients, the rules engine:
  identify a message condition in the email, the message condition having a corresponding action;
  when the email meets the message condition, bifurcate the email and execute the corresponding action; and
  when the email does not meet the message condition, proceed to the next rule, if any.

With reference to FIG. 2, a message addressed to R1, R2, R3 and R4 is evaluated by a rule (e.g., Rule 1) according to one embodiment of the invention. The rule specifies that messages sent to R1 and R2 of group 1 should be bifurcated if the message includes other addressees and the instance of the message sent to R1 and R2 should have a disclaimer added. The rule is applied to the message of FIG. 2 and determines that the message is being sent to R1 and R2 and that the message is being sent to others (i.e., R3 and R4). Thus, the message should be bifurcated and a disclaimer is added to the instance of the message to R1 and R2 and the instance of the message to R3 and R4 does not include a disclaimer.

According to one embodiment of the invention, a transport processor executes a rule engine which is provided with the ability to bifurcate on a per-rule basis, based on a rule and its execution result. In general, the bifurcation may be optimized and only applied to email messages that require bifurcation (e.g., email messages that have selected bifurcated instances to which an action applies and having other instances to which the same action does not apply).

Figure 3:
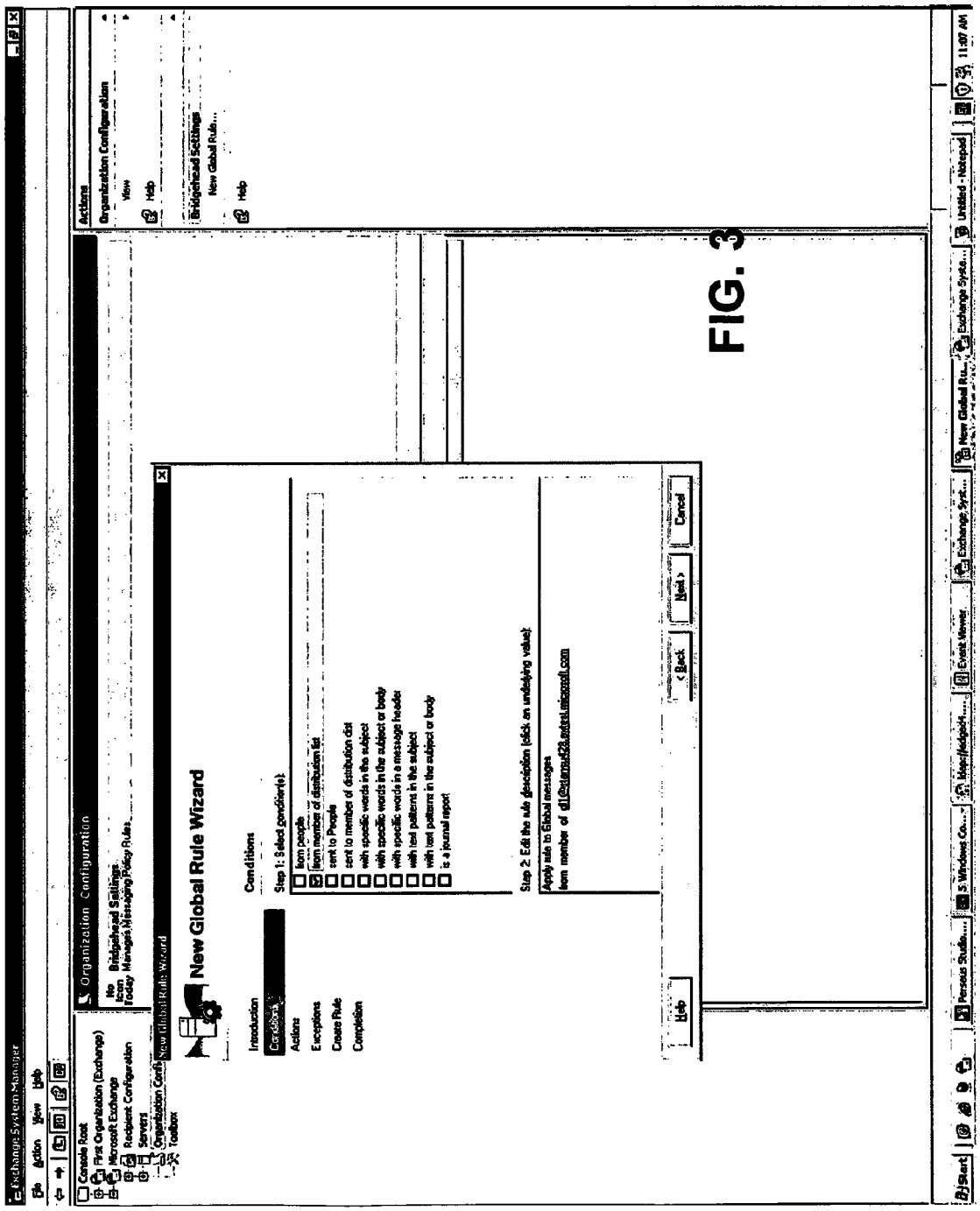
FIG. 3 is a screen shot of one embodiment of an exemplary implementation of a system according to the invention illustrating condition selection.

FIG. 3 is a screen shot of one embodiment of an exemplary implementation of a system according to the invention. FIG. 3 illustrates a user interface which allows the user to select a condition to implement a rule based on a particular recipient or recipients of a message. In FIG. 3, the user in Step 1 has selected as a condition for the rule that the email be "from member of distribution list." In Step 2, the user has indicated that the rule is applied to "Global messages" and "from members of dll@stansu428.extest.microsoft.com. In FIG. 4, a screen shot illustrates one embodiment of an exemplary implementation of a system according to the invention illustrating action selection. After indicating the condition or conditions (see FIG. 3), the user in Step 1 of FIG. 4 has selected as an action of "send bounce message to sender". This action follows when the condition of FIG. 3 is met. In Step 2, the user has indicated that the action is "send to Administrator . . . " and send "message rejected by policy abcde" to sender.

In summary, policy abcde prohibits instances of emails to distribution list (dl) 1 and permits instances of emails to others even though the email includes distribution list 1. Instances of emails to distribution list 1 will be sent to the administrator and the sender will be informed that their message to distribution list 1 has been rejected by policy abcde.

The following are examples of possible models and language syntax for the rules. In the discussion herein, the following glossaries and abbreviations are used:
mc—message condition—such as "Subject something." Note that "anyof/allof Message.Recipients isMemberOf DL1" is a "message condition", because the subject is actually the message.
rc—recipient condition—such as Recipient IsMemberOf DL1.

In many current rule languages, all conditions are message-related conditions. According to various embodiments of the invention, recipient-related conditions are added for more flexibility and control.

Email Transport Rule Per-Recipient Condition

In order to implement a per-recipient rule, the rule language must be regarded as per-recipient. In other words, logically all emails are bifurcated for each and every recipient. Optionally, the rule engine may have an internal mechanism to optimize bifurcation by grouping recipients and selectively applying bifurcation.

In this embodiment, the rule writer may freely mix mc and rc, because they are all assumed to be per-recipient execution conditions.

For example, this embodiment may be implemented as follows: Assume that the condition evaluation sequence is a plurality of message conditions (mc), each followed by its corresponding recipient condition (rc), e.g., mc1, rc1, mc2, rc2. First, a loop is run: for each recipient, the rule engine evaluates each email for its recipient condition and its corresponding message condition (e.g., rc1 is evaluated for mc1, rc2 is evaluated for mc2, rc3 is evaluated for mc3, . . . ).

After each evaluation, the rule engine maintains a list of recipients that are evaluated to "true/false" with respect to the conditions and bifurcation (e.g., a <fork> action) is applied, if needed, for each bifurcated instance involving a "true" recipient. The message condition is then applied to the bifurcated instances. All instances of the message are then advanced to the next rule, if any.

In one embodiment, the result of the analysis with respect to the message conditions (e.g., mc1, mc2, . . . ) is maintained in a cache for use in conjunction with evaluating each recipient condition. In other words, these message conditions will be evaluated with the same result for every recipient.

The following is an example of one embodiment of a rule, which tends to have a simpler language syntax because it allows recipient conditions (rc) and message conditions (mc) to be mixed as a single condition within the schema and not separate or discrete conditions.

An example of a schema of such a syntax is:

```
<rule>
    <condition>
        <(mc1)><(rc1)>... <(mc)> ... <(rc)>
    </ condition>
    <action/>
</ rule>
```

Thus, the above illustrates one embodiment for a schema for a rule for a transport engine to be applied to an email having multiple recipients. The <condition> comprises a first attribute (e.g., data field) identifying a series of a plurality of message conditions (e.g., mc, a parameter) and a plurality of recipient conditions (e.g., rc, a parameter), each message condition followed by its corresponding recipient condition (e.g., <(mc1)><(rc1)> ... <(mc)> ... <(rc)>). Each recipient condition (e.g., domain or parameter) corresponds to one of the message conditions. A second attribute identifies an action to be selectively applied to the email when the email meets at least one of the message conditions and its corresponding recipient condition.

Thus, the above illustrates one embodiment for a method of applying a rule to an email to be transported having multiple recipients. A series of a plurality of message conditions intermixed with a plurality of recipient conditions are identified in the email. Each recipient condition corresponds to and follows one of the message conditions. An action corresponding to the message conditions is identified and applied to the email when the email meets at least one of the message conditions and its corresponding recipient condition.

Thus, the above illustrates one embodiment for a system for applying a rule to an email to be transported having multiple recipients. The transport processor of FIG. 1 includes instructions to:

identify one or more of a plurality of message conditions in the email;

identify one or more of a plurality of recipient conditions in the email, each recipient condition corresponding to one of the message conditions;

identify an action corresponding to the message conditions to be applied to the email; and selectively apply the identified action to the email when the email meets at least one of the message conditions and its corresponding recipient condition.

Email Transport Rule Recipient Tree Condition

In one embodiment according to the invention, a recipient condition tree is introduced into the rule. The tree would specify all recipient conditions for all recipients. This allows the rule writer to specify a set of recipient conditions, and to separately and independently specify a set of message conditions. As compared to the per-recipient rule noted above, in this tree rule the recipient conditions and the message conditions are separated or discrete conditions. An example of a schema of such a syntax is:

```
<rule>
    <(rc)>...</ (rc)>
    <(mc)>..</ (mc)>
    <action>..</ action>
</ rule>
```

Similar to the per-recipient rule noted above, the tree rule is implemented by evaluating each recipient condition for each rule, and keeping a list (e.g., in a cache) of recipients that match. Then each message condition is evaluated. If the message condition is true, then the message is bifurcated, if needed. Actions are performed on one copy, and both copies of the message are advanced to the next rule.

This tree rule presents a simple syntax but introduces a recipient condition tree which may be increase complexity of rule composition.

Thus, the above illustrates one embodiment for a schema for a rule for a transport engine to be applied to an email having multiple recipients. A first attribute (e.g., <(rc)> . . . </(rc)>) identifies a recipient condition tree including a plurality of recipient conditions. A second attribute (e.g., <(mc)> . . . </(mc)>) identifies a plurality of message conditions, each message condition corresponding to one of the recipient conditions. A third attribute (e.g., <action> . . . </action>) identifies a plurality of actions, each action corresponding to one of the message conditions. When the email meets at least one of the recipient conditions and its corresponding message condition, the action corresponding thereto is selectively applied to the email.

Thus, the above illustrates one embodiment for a method of applying a rule to an email to be transported having multiple recipients. One or more of a plurality of recipient conditions as specified within a recipient condition tree are identified in the email. One or more of a plurality of message conditions corresponding to the recipient conditions are identified in the email. A plurality of actions are identified, each action corresponding to one of the message conditions. One or more of the plurality of actions corresponding to one of the message conditions is selectively applied to the email when it meets at least one of the recipient conditions and its corresponding message condition.

Thus, the above illustrates one embodiment for a system for applying a rule to an email to be transported having multiple recipients. The transport processor of FIG. 1 includes instructions to:

Identify in the email one or more of a plurality of recipient conditions as specified in a condition tree;

Identify in the email one or more of a plurality of message conditions, each message condition corresponding to one of the recipient conditions;

Identify one or more of a plurality of actions, each action corresponding to one of the message conditions; and Selectively apply the identified action to the email when the email meets at least one of the message conditions and its corresponding recipient condition.

Email Transport Rule Recipient Flat Declaration Condition

Another embodiment of the invention which is similar to above recipient-condition tree comprises a rule which specifies the recipient conditions as flat declarations. An example of a schema of such a syntax is:

```
<rule name = "rule1">
    <applyTo DLs= "DL1;DL2...DLN" />
    <conditions />
    <actions />
</ rule>
``` wherein DL is a distribution list defining a recipient condition.

This rule is similar to the tree rule above except that the recipient-condition is a flat declaration. As with the other embodiments above, before this rule is executed, the transport email message will be bifurcated, and then the bifurcated message will be pushed to the condition testing and actions. The same bifurcation and "cursor" logics are needed. For example, the result of the analysis with respect to message conditions is maintained in a cache for use in conjunction with evaluating each recipient condition. Which rule is used depends in part on the complexity of the recipient conditions. Frequently, complicated nested recipient conditions are minimal and rare so that this flat declaration rule may be used without introducing more complexity.

Thus, the above illustrates one embodiment for a schema for a rule for a transport engine to be applied to an email having multiple recipients. A first attribute (e.g., <applyTo DLs="DL1; DL2 . . . DLN"/>) identifies a flat declaration of recipient conditions specifying a plurality of recipient conditions. A second attribute (e.g., <condition> . . . </condition>) identifies one or more message conditions, each message condition corresponding to one of the recipient conditions. A third attribute (e.g., <action> . . . </action>) identifies one or more actions to be selectively applied to the email, each action corresponding to one of the message conditions. When the email meets at least one of the recipient conditions and its corresponding message condition, the action corresponding thereto is applied to the email.

Thus, the above illustrates one embodiment for a method of applying a rule to an email to be transported having multiple recipients. A one or more of a plurality of recipient conditions as specified within a declaration of recipient conditions is identified in the email. A plurality of message conditions are identified in the email, each message condition corresponding to one of the recipient conditions. A plurality of actions are identified, each action corresponding to one of the message conditions. One or more of the plurality of actions corresponding to one of the message conditions is selectively applied to the email when it meets at least one of the recipient conditions and its corresponding message condition.

Thus, the above illustrates one embodiment for a system for applying a rule to an email to be transported having multiple recipients. The transport processor of FIG. 1 includes instructions to:

Identify in the email one or more of a plurality of recipient conditions specified within a declaration of recipient conditions;

Identify in the email a plurality of message conditions, each message condition corresponding to one of the recipient conditions;

Identify a plurality of actions, each action corresponding to one of the message conditions; and Selectively apply the identified action to the email when the email meets at least one of the message conditions and its corresponding recipient condition.

The following is an example of another embodiment of the invention of XML syntax for a rule:

```
<rule>
    <fork>
    <fork exception>
    <condition>
    <action/ >
</ rule>
```

In this embodiment, a bifurcation element (e.g., <fork>) may contain <list> or <recipient> elements to indicate this rule will only execute for these specified recipients. Attribute Exception="True" means the recipients or list should be excluded. If some recipients of a message match these criteria in bifurcation elements while other recipients do not, the message will be bifurcated. It is contemplated that there can be multiple rules (e.g., multiple conditions). For example,

```
<rule name="rule5">
    <fork>
        <list name="group1@mytest" />
    </fork>
    <fork exception="True">
        <recipient address="Administrator@mytest" />
    </fork>
    <condition>
        <and>
            <is property="Message.Sender">
                <value>usr2@mytest</value>
            </is>
            <contains property="Message.Subject">
                <value>abc</value>
            </contains>
        </and>
    </condition>
    <action name="DeleteMessage" />
</rule>
```

Having described various embodiments of the invention in detail, it will be apparent that modifications and variations are possible without departing from the scope of the various embodiments of the invention as defined in the appended claims.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein. For example, it is contemplated that executing or performing a particular element before, contemporaneously with, or after another element is within the scope of the various embodiments of the invention.

When introducing elements of the various embodiments of the present invention, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several advantageous results attained.

As various changes could be made in the above constructions, products, and methods without departing from the scope of the various embodiments of the invention, it is intended that all matter contained in the above description and shown in the accompanying drawings shall be interpreted as illustrative and not in a limiting sense.

What is claimed is:

1. A system for applying one or more rules to an email prior to transport, the email having multiple recipients, said system comprising:

a rules engine applying the one or more rules to the email prior to transport, said email addressed to at least two email recipients, and bifurcating said email into at least two email instances prior to transport while applying the one or more rules to the email on a per-rule basis, wherein the one or more rules are formatted according to a specified schema having the following XML syntax:

```
<rule>
   <condition>
      <(mc1)><(rc1)>... <(mc)> ... <(rc)>
   </condition>
   <action/>
</rule>
``` wherein mc is a message condition and rc is a recipient condition and wherein mc1 is a message condition and rc1 is a recipient condition corresponding to mc1, wherein the recipient conditions and the message conditions are mixed in a single condition element within the specified schema;

a processor configured to execute the rules engine, wherein the rules engine comprises computer-executable instructions to:

apply a formatted rule of the one or more rules to said email addressed to the at least two email recipients prior to transport, such that the rules engine identifies a message condition in the email as indicated by the formatted rule, the message condition having a corresponding action, wherein the rules engine identifies a recipient condition in the email, said recipient condition corresponding to the message condition, the recipient condition specifying at least one email, wherein the result of the analysis with respect to message conditions is maintained in a cache for use in conjunction with evaluating each recipient condition;

when the email addressed to the at least two email recipients meets the identified message condition of the formatted rule and meets the identified recipient condition of the formatted rule, bifurcate the email into at least two email instances prior to transport and execute the corresponding action on the email instances as indicated by the formatted rule prior to transport;

proceed to a next formatted rule of the one or more rules prior to transport if a next formatted rule exists for the email instances; and thereafter transport each of the at least two email instances to each of the at least two email recipients.

2. The system of claim 1 wherein the processor includes instructions to:

identify one or more of a plurality of message conditions in the email prior to transport;

identify one or more of a plurality of recipient conditions in the email prior to transport, each recipient condition corresponding to one of the message conditions, the recipient condition specifying email recipients;

identify an action corresponding to the message conditions to be applied to the email prior to transport; and selectively apply the identified action to the email prior to transport when the email meets at least one of the message conditions and its corresponding recipient condition.

3. The system of claim 1, where said rule engine maintains a list of recipients that are evaluated prior to transport and bifurcates the email into two or more email instances prior to transport in response to application of the schema, wherein the email instances are then advanced to the next rule if the next rule exists.

4. The system of claim 1 wherein the bifurcating is optimized and only applied to email messages that have selected email instances to which an action applies.

5. The system of claim 1 wherein said rule engine optimizes bifurcation by grouping recipients and applies bifurcation selectively.

6. The system of claim 1, wherein the corresponding action includes one or more of the following: stripping attachments, adding attachments, adding text, re-routing the email, adding or deleting recipients, rejecting the email, silently deleting the email, dropping the network connection, changing subject or other headers of the email, putting the email in quarantine, setting a spam confidence level, archiving the email, logging an event regarding the email, changing delivery priority of the email, and applying security templates.

7. A method for applying one or more rules to an email prior to transport, the email having multiple recipients, said method comprising:

applying a formatted rule of the one or more rules to the email prior to transport, said one or more rules being formatted according to a specified schema, said email addressed to at least two email recipients, wherein said applying identifies a message condition in the email as indicated by the formatted rule, the message condition having a corresponding action, wherein said applying also identifies a recipient condition in the email, said recipient condition corresponding to the message condition, the recipient condition specifying at least one email recipient, wherein the recipient condition and the message condition are mixed in a single condition element within the formatted rule;

when the email addressed to the at least two email recipients meets the message condition of the formatted rule and meets the identified recipient condition of the formatted rule, bifurcating the email into at least two email instances prior to transport and executing the corresponding action on said email as indicated by the formatted rule prior to transport, wherein the corresponding action on said email includes at least one of the following: stripping attachments, adding attachments, adding text, re-routing the email, adding or deleting recipients, rejecting the email, silently deleting the email, dropping the network connection, changing subject or other headers of the email, putting the email in quarantine, setting a spam confidence level, archiving the email, logging an event regarding the email, changing delivery priority of the email, and applying security templates;

maintaining in a cache a result of the analysis with respect to message conditions for use in conjunction with evaluating each recipient condition; and proceeding to a next formatted rule of the one or more rules prior to transport if the next formatted rule exists for the email instances;

wherein said method is executed by a rules engine for applying the one or more rules to the email prior to transport and bifurcating the email into at least two email instances on a per-rule basis prior to transport, based on the result of the execution of the one or more rules.

8. The method of claim 7 comprising:

identifying one or more of a plurality of message conditions in the email prior to transport;

identifying one or more of a plurality of recipient conditions in the email prior to transport, each recipient condition corresponding to one of the message conditions, the recipient condition specifying email recipients, wherein the recipient conditions are intermixed with the message conditions;

identifying an action corresponding to the message conditions to be applied to the email instances prior to transport; and applying the identified action to the email instances prior to transport when the email meets at least one of the message conditions and its corresponding recipient condition.

9. The method of claim 7 wherein the bifurcating is optimized and only applied to email messages that have selected bifurcated instances to which an action applies.

10. The method of claim 7 wherein said rules engine optimizes bifurcation by grouping recipients and applies bifurcation selectively.

11. The method of claim 7 wherein said rules engine maintains a list of recipients that are evaluated prior to transport and bifurcates the email into at least two email instances prior to transport in response to application of a schema, wherein bifurcated email instances are then advanced to the next rule prior to transport if the next rule exists.

* * * * *